US009300588B2

(12) United States Patent
Koshimizu et al.

(10) Patent No.: US 9,300,588 B2
(45) Date of Patent: Mar. 29, 2016

(54) MOBILE COMMUNICATION METHOD, MOBILE COMMUNICATION SYSTEM AND RADIO BASE STATION

(75) Inventors: Takashi Koshimizu, Tokyo (JP); Itsuma Tanaka, Tokyo (JP); Tomoki Shibahara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 149 days.

(21) Appl. No.: 14/130,565

(22) PCT Filed: Jun. 22, 2012

(86) PCT No.: PCT/JP2012/065973
§ 371 (c)(1),
(2), (4) Date: Jan. 2, 2014

(87) PCT Pub. No.: WO2013/008607
PCT Pub. Date: Jan. 17, 2013

(65) Prior Publication Data
US 2014/0119192 A1    May 1, 2014

(30) Foreign Application Priority Data

Jul. 8, 2011   (JP) ................................ 2011-152256
Nov. 9, 2011  (JP) ................................ 2011-245588

(51) Int. Cl.
*H04L 12/26*  (2006.01)
*H04L 12/825*  (2013.01)
*H04W 28/02*  (2009.01)

(52) U.S. Cl.
CPC ........... *H04L 47/25* (2013.01); *H04W 28/0231* (2013.01); *H04W 28/0252* (2013.01); *H04W 28/0289* (2013.01)

(58) Field of Classification Search
CPC . H04L 47/25; H04L 28/0231; H04L 28/0252; H04L 28/0289
USPC ................... 370/229–230, 236, 329; 709/229
See application file for complete search history.

(56) References Cited

U.S. PATENT DOCUMENTS

| 8,831,612 | B2* | 9/2014 | Kim et al. ..................... 455/436 |
| 2010/0318670 | A1* | 12/2010 | Al-Shalash et al. .......... 709/229 |
| 2011/0158090 | A1 | 6/2011 | Riley et al. |
| 2011/0235569 | A1* | 9/2011 | Huang et al. .................. 370/315 |

(Continued)

FOREIGN PATENT DOCUMENTS

| EP | 2448321 A1 | 5/2012 |
| JP | 2007-529129 A | 10/2007 |

(Continued)

OTHER PUBLICATIONS

Extended European Search Report mailed Mar. 11, 2015 in corresponding European Application No. 12811788.4 (6 pages).

(Continued)

*Primary Examiner* — Phuc Tran
(74) *Attorney, Agent, or Firm* — Osha Liang LLP

(57) ABSTRACT

When congestion in an eNB is detected, effective utilization of resources is achieved by adjusting not only a data flow rate in an EPS-RAB but also a band of a core network bearer corresponding with the EPS-RAB. A mobile communication method according to an embodiment includes a step A of causing an eNB to notify an MME of a cause of congestion and identifier information of the EPS-RAB involved in the congestion, when the eNB detects the congestion.

10 Claims, 8 Drawing Sheets

(56) References Cited

U.S. PATENT DOCUMENTS

| | | | |
|---|---|---|---|
| 2012/0087330 A1* | 4/2012 | Zhu et al. | 370/329 |
| 2013/0042011 A1* | 2/2013 | Sugizaki et al. | 709/227 |
| 2013/0250750 A1 | 9/2013 | Nishida et al. | |

FOREIGN PATENT DOCUMENTS

| | | |
|---|---|---|
| JP | 2010/537532 A | 12/2010 |
| WO | 2005/057866 A1 | 6/2005 |
| WO | 2009/024596 A1 | 2/2009 |
| WO | 2010/149084 A1 | 12/2010 |
| WO | 2012/073936 A1 | 6/2012 |

OTHER PUBLICATIONS

International Search Report for corresponding International Application No. PCT/JP2012/065973, mailed Sep. 25, 2012 (4 pages).

Written Opinion for corresponding International Application No. PCT/JP2012/065973, mailed Sep. 25, 2012 (4 pages).

3GPP TS 36.300 V10.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Jun. 2011 (194 pages).

3GPP TS 23.401 V10.7.0; "3rd Generation Partnership Project; Technical Specification Group Services and System Aspects; General Packet Radio Service (GPRS) enhancements for Evolved Universal Terrestrial Radio Access Network (E-UTRAN) access (Release 10);" Mar. 2012 (278 pages).

3GPP TS 23.203 V11.5.0; "3rd Generation Partnership Project; Technical Specification Group Services and System Aspects; Policy and charging control architecture (Release 11);" Mar. 2012 (175 pages).

Office Action in counterpart Japanese Patent Application No. 2011-245588, dated Sep. 8, 2015 (4 pages).

\* cited by examiner

MOBILE COMMUNICATION METHOD, MOBILE COMMUNICATION SYSTEM AND RADIO BASE STATION

TECHNICAL FIELD

The present invention relates to a mobile communication method, a mobile communication system and a radio base station.

BACKGROUND ART

In a mobile communication system conventionally specified in the 3GPP, an eNB (radio base station) is configured to adjust a data flow rate in an EPS-RAB (Evolved Packet System-Radio access Bearer) established between a UE (mobile station) and the eNB, when the eNB detects congestion.

PRIOR ART DOCUMENT

Non-Patent Document

Non-Patent document 1: 3GPP TS23.401
Non-Patent document 2: 3GPP TS23.203
Non-Patent document 3: 3GPP TS36.300

SUMMARY OF THE INVENTION

The mobile communication system conventionally specified in the 3GPP, however, has a problem that, when an eNB detects congestion, the eNB even can adjust a data flow rate in an EPS-RAB as described above, but cannot adjust bands of core network bearers (an S1 bearer and an S5 bearer) corresponding with the EPS-RAB.

Therefore, the present invention has been made in view of the foregoing problem, and has an objective to provide a mobile communication method, a mobile communication system and a radio base station which are capable of achieving effective utilization of resources by adjusting a data flow rate of an EPS-RAB and bands of core network bearers corresponding with the EPS-RAB, when congestion in the eNB is detected.

A first feature of the present invention is summarized as a mobile communication method in which a mobile station transmits and receives a data signal via a radio access bearer established between the mobile station and a radio base station and via a core network bearer established between the radio base station and a gateway apparatus, the method including a step A of causing the radio base station to notify a mobility management node of a cause of congestion and identifier information of the radio access bearer (and further a data flow running in the radio access bearer, and the like) involved in the congestion, when the radio base station detects the congestion.

A second feature of the present invention is summarized as a mobile communication system in which a mobile station transmits and receives a data signal via a radio access bearer established between the mobile station and a radio base station and via a core network bearer established between the radio base station and a gateway apparatus, and in which the radio base station is configured to notify a mobility management node of a cause of congestion and identifier information of the radio access bearer (and further a data flow running in the radio access bearer, and the like) involved in the congestion, when the radio base station detects the congestion.

A third feature of the present invention is summarized as a radio base station in a mobile communication system in which a mobile station transmits and receives a data signal via a radio access bearer established between the mobile station and the radio base station and via a core network bearer established between the radio base station and a gateway apparatus, the radio base station including a transmission unit configured to notify a mobility management node of a cause of congestion and identifier information of the radio access bearer (and further a data flow running in the radio access bearer, and the like) involved in the congestion, when the radio base station detects the congestion.

MODE FOR CARRYING OUT THE INVENTION

Mobile Communication System According to First Embodiment of the Present Invention A mobile communication system according to a first embodiment of the present invention is described in reference to FIGS. 1 to 4.

Figure 1:
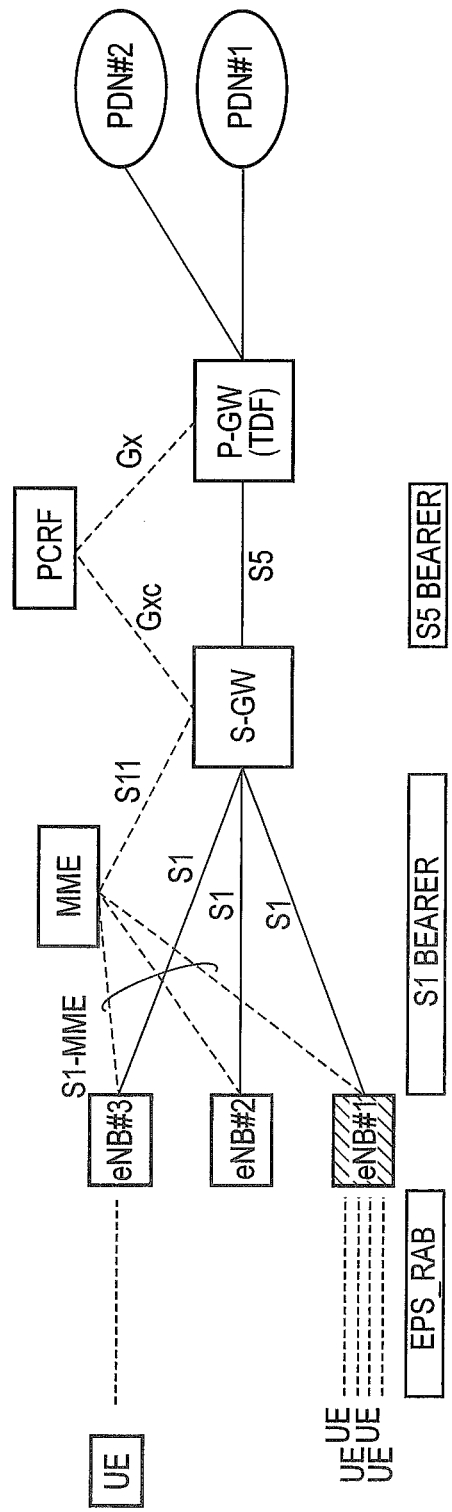
FIG. 1 is an overall configuration diagram of a mobile communication system according to a first embodiment of the present invention.

As illustrated in FIG. 1, the mobile communication system according to the present embodiment includes a PCRF (Policy and Charging Rules Function: a policy and charging rules server apparatus), an MME (Mobility Management Entity: mobility management node), a P-GW (PDN-Gateway), an S-GW (Serving-Gateway), and an eNB#1 to an eNB#3.

Here, the P-GW and the S-GW can be connected to each other via an S5 interface, the S-GW and each of the eNB#1 to the eNB#3 can be connected to each other via an S1 interface, the MME and each of the eNB#1 to the eNB#3 can be connected to each other via an S1-MME interface, the MME and the S-GW can be connected to each other via an S11 interface, and the PCRF and the P-GW can be connected to each other via a Gx interface.

Incidentally, if PMIP (Proxy Mobile IP) is applied to the S5 interface, the PCRF and the S-GW can be connected to each other via a Gxc interface.

To put it differently, an EPS-RAB can be established between the eNB#1 to the eNB#3 and the UE, an S1 bearer corresponding with the EPS-RAB can be established between the eNB#1 to the eNB#3 and the S-GW, and an S5 bearer corresponding with the EPS-RAB/S1 bearer can be established between the S-GW and the P-GW.

In addition, the P-GW can be connected to PDN (Packet Data Network) #1/#2.

Figure 2:
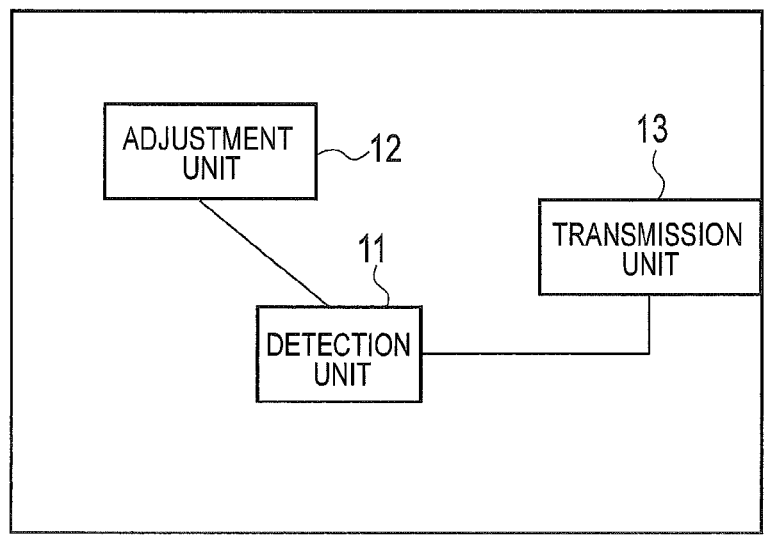
FIG. 2 is a functional block diagram of an eNB according to the first embodiment of the present invention.

As illustrated in FIG. 2, the eNB includes a detection unit 11, an adjustment unit 12, and a transmission unit 13.

The detection unit 11 is configured to detect congestion in the eNB.

Figure 3:
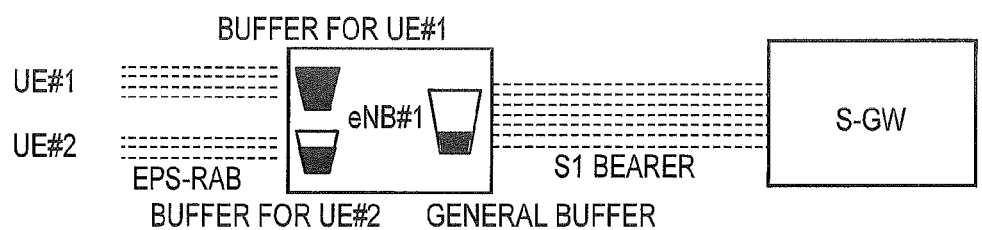
FIG. 3 is a diagram for explaining an operation of a mobile communication system according to the first embodiment of the present invention.

Here, as illustrated in FIG. 3, the eNB is provided with a buffer for a UE which is a buffer dedicated to each UE, and a general buffer which is a buffer for the entire eNB.

The buffer for UE is a buffer dedicated to accumulate signals to be received and transmitted by a particular UE, and the general buffer is a fixed volume of buffer to be used when any buffer for particular UE overflows.

It should be noted that, for a bearer for a UE, "QCI (QoS Class ID)" indicating QoS (Quality of Service) is set, and "Priority (priority level)," "Delay (allowable delay)" and "Packet Loss Rate (allowable packet loss rate)" are determined based on the QCI. Then, the size and the priority of the buffer for the UE used by the bearer for the UE are also determined.

For example, the detection unit 11 is configured to detect congestion in the eNB in a case where a buffer for a particular UE overflows, a case where the usage ratio of a buffer for a particular UE exceeds a predetermined value, a case where the general buffer overflows, a case where the usage ratio of the general buffer exceeds a predetermined value, or another similar case.

The adjustment unit 12 is configured to adjust a data flow rate in the EPS-RAB when the detection unit 11 detects the congestion in the eNB. Specifically, the adjustment unit 12 is configured to lower the data flow rate in the EPS-RAB when the detection unit 11 detects the congestion in the eNB.

Here, the adjustment unit 12 is configured to adjust a data flow rate in the EPS-RAB for a particular UE in a case where the detection unit 11 detects an overflow of the buffer for the particular UE, a case where the usage ratio of the buffer for the particular UE exceeds the predetermined value, or another similar case.

In addition, the adjustment unit 12 is configured to adjust a data flow rate in the EPS-RAB for a UE using the general buffer in a case where the detection unit 11 detects an overflow of the general buffer, a case where the usage ratio of the general buffer exceeds the predetermined value, or another similar case.

For the latter case, the adjustment unit 12 may be configured to determine an EPS-RAB to be adjusted in the data flow rate from among the EPS-RABs for UEs using the general buffer, on the basis of the QCIs of the EPS-RABs for the UEs.

The transmission unit 13 is configured to transmit various signals to the UEs, the S-GW, the MME and others.

For example, the transmission unit 13 is configured to, when the detection unit 11 detects congestion in the eNB, notify the MME of a cause of the congestion ("Cause Value") and identifier information ("bearer-ID") of the EPS-RAB involved in the congestion.

Here, the transmission unit 13 may be configured to notify of identifier information ("data flow ID") of a data flow running in the EPS-RAB.

Here, the transmission unit 13 is configured to, in a case where the detection unit 11 detects an overflow of the buffer for a particular UE, a case where the usage ratio of the buffer for the particular UE exceeds the predetermined value, or another similar case, notify of the cause of the congestion indicating the case, and also notify of the identifier information of the EPS-RAB for the particular UE (that is, the identifier information of the EPS-RAB adjusted by the adjustment unit 12).

Incidentally, for these cases, the transmission unit 13 may be configured to notify of the identifier information ("data flow ID") of each data flow running in the EPS-RAB.

In addition, the transmission unit 13 is configured to, in a case where the detection unit 11 detects an overflow of the general buffer, a case where the usage ratio of the general buffer exceeds the predetermined value, or another similar case, notify of the cause of the congestion indicating the case, and also notify of the identifier information of the EPS-RAB for a UE using the general buffer (that is, the identifier information of the EPS-RAB adjusted by the adjustment unit 12).

Incidentally, for these cases, the transmission unit 13 may be configured to notify of the identifier information ("data flow ID") of each data flow running in the EPS-RAB.

Hereinafter, one example of an operation of the mobile communication system according to the present embodiment is described with reference to FIGS. 4 and 5.

In the first place, the operation in a case where the PMIP is applied to the S5 interface is described with reference to FIG. 4.

Figure 4:
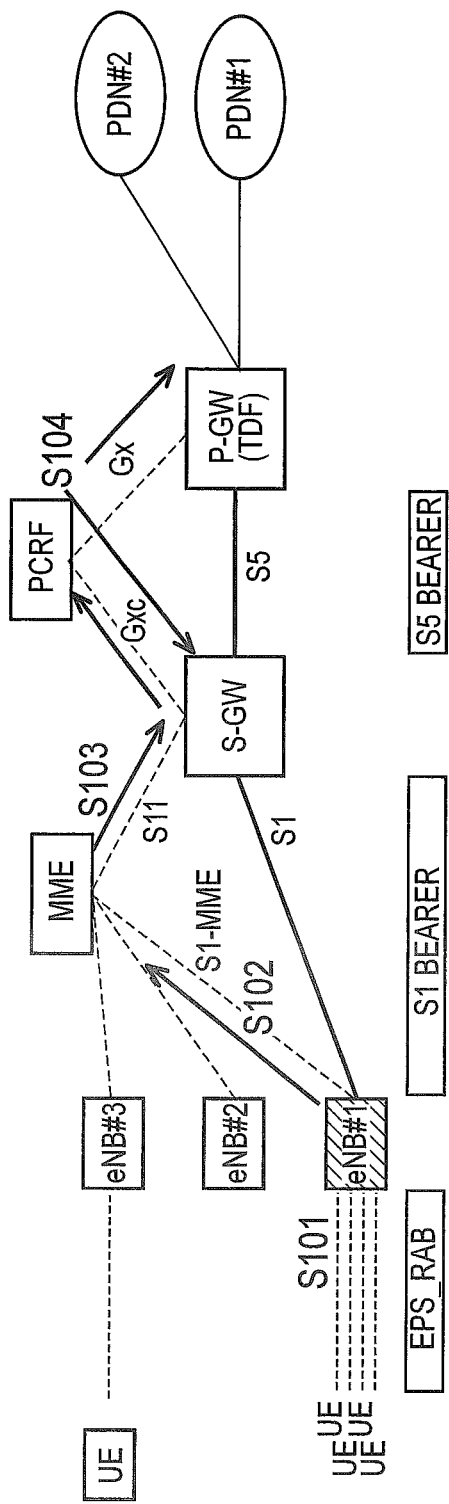
FIG. 4 is a diagram for explaining an operation of the mobile communication system according to the first embodiment of the present invention.

As illustrated in FIG. 4, when the eNB#1 detects congestion in the eNB by detecting a buffer overflow in step S101, the eNB#1 notifies the MME of the cause of the congestion and the identifier information of the EPS-RAB involved in the congestion via the S1-MME interface in step S102.

In step S103, on the basis of the notification, the MME sends the S-GW "Bearer Modification" indicating an instruction to modify the settings of the core network bearers corresponding with the EPS-RAB involved in the congestion. Then, the S-GW sends the PCRF "Bearer Modification" indicating an instruction to modify the settings of the core network bearers corresponding with the EPS-RAB involved in the congestion.

In this step, "Update Bearer" specified in TS23.401 of the 3GPP or another massage may be used in place of "Bearer Modification."

In step S104, the PCRF sends the S-GW and the P-GW "Bearer Modification" indicating an instruction to modify the settings of the core network bearers corresponding with the EPS-RAB involved in the congestion.

Here, in response to the "Bearer Modification," the S-GW and the P-GW modify the settings of the S1 bearer and the S5 bearer corresponding with the EPS-RAB involved in the congestion.

To be specific, the S-GW and the P-GW reduce the band of the S1 bearer and the band of the S5 bearer corresponding with the EPS-RAB involved in the congestion, in response to the "Bearer Modification."

Incidentally, if the P-GW has a TDF (Traffic Detection Function), the P-GW performs DPI (Deep Packet Inspection) on the basis of the EPS-RAB identifier information notified of by the foregoing "Bearer Modification." Then, the S-GW and the P-GW modify the settings on a flow-by-flow basis in the S1 bearer and the S5 bearer corresponding with the EPS-RAB involved in the congestion.

More specifically, in this case, the S-GW and the P-GW adjust (namely, reduce) the bands on the flow-by-flow basis in the S1 bearer and the S5 bearer corresponding with the EPS-RAB involved in the congestion.

For example, in this case, the S-GW and the P-GW can perform control on the flow-by-flow basis in the S1 bearer and the S5 bearer having the same QCI set therein, by reducing the band of a flow for non-GBR (Guaranteed Bit Rate) data communication (for example, communication on game) without reducing the band of a flow for emergency communication (for example, communication on a disaster).

In the second place, the operation in a case where GTP (GPRS Tunneling Protocol) is applied to the S5 interface is described with reference to FIG. 5.

Figure 5:
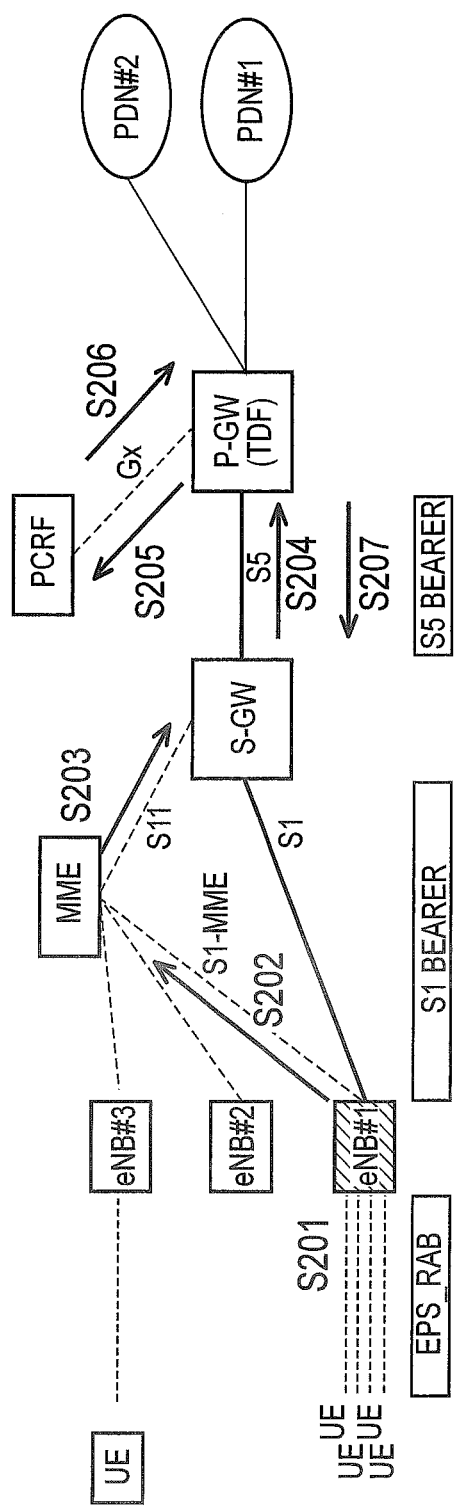
FIG. 5 is a diagram for explaining an operation of the mobile communication system according to the first embodiment of the present invention.

As illustrated in FIG. 5, when the eNB#1 detects congestion in the eNB by detecting a buffer overflow in step S201, the eNB#1 notifies the MME of the cause of the congestion and the identifier information of the EPS-RAB involved in the congestion via the S1-MME interface in step S202.

In step S203, the MME sends the S-GW "Bearer Modification" indicating an instruction to modify the settings of the core network bearers corresponding with the EPS-RAB involved in the congestion. In step S204, the S-GW sends the PCRF "Bearer Modification" indicating an instruction to modify the settings of the core network bearers corresponding with the EPS-RAB involved in the congestion. Then, in step S205, the P-GW sends the PCRF "Bearer Modification" indicating an instruction to modify the settings of the core network bearers corresponding with the EPS-RAB involved in the congestion.

In step S206, the PCRF sends the P-GW "Bearer Modification" indicating an instruction to modify the settings of the core network bearers corresponding with the EPS-RAB involved in the congestion. In step S207, the P-GW sends the S-GW "Bearer Modification" indicating an instruction to modify the settings of the core network bearers corresponding with the EPS-RAB involved in the congestion.

Here, in response to "Bearer Modification," the S-GW and the P-GW modify the settings of the S1 bearer and the S5 bearer corresponding with the EPS-RAB involved in the congestion.

To be specific, the S-GW and the P-GW reduce the band of the S1 bearer and the band of the S5 bearer corresponding with the EPS-RAB involved in the congestion, in response to the "Bearer Modification."

Incidentally, if the P-GW has the TDF (Traffic Detection Function), the P-GW performs the DPI on the basis of the EPS-RAB identifier information notified of by the foregoing "Bearer Modification." Then, the S-GW and the P-GW modify the settings on a flow-by-flow basis in the S1 bearer and the S5 bearer corresponding with the EPS-RAB involved in the congestion.

More specifically, in this case, the S-GW and the P-GW adjust (namely, reduce) the bands on the flow-by-flow basis in the S1 bearer and the S5 bearer corresponding with the EPS-RAB involved in the congestion.

For example, in this case, the S-GW and the P-GW can perform control on the flow-by-flow basis in the S1 bearer and the S5 bearer having the same QCI set therein, by reducing the band of a flow for non-GBR data communication without reducing the band of a flow for emergency communication.

In the mobile communication system according to the present embodiment, when the eNB detects congestion, the eNB can notify the MME of the cause of the congestion and the identifier information of the EPS-RAB involved in the congestion. Thus, the mobile communication system adjusts not only the data flow rate in the EPS-RAB but also the bands in the core network bearers corresponding with the EPS-RAB, thereby achieving effective utilization of resources.

MODIFIED EXAMPLE 1

Hereinafter, with reference to FIGS. 6 and 7, a mobile communication system according to Modified Example 1 of the present invention is described with attention paid to different points from the foregoing mobile communication system according to the first embodiment.

In the mobile communication system according to Modified Example 1, the eNB has the foregoing TDF and is configured to be capable of performing the DPI instead of the P-GW.

In the first place, the operation in a case where the PMIP is applied to the S5 interface is described with reference to FIG. 6.

Figure 6:
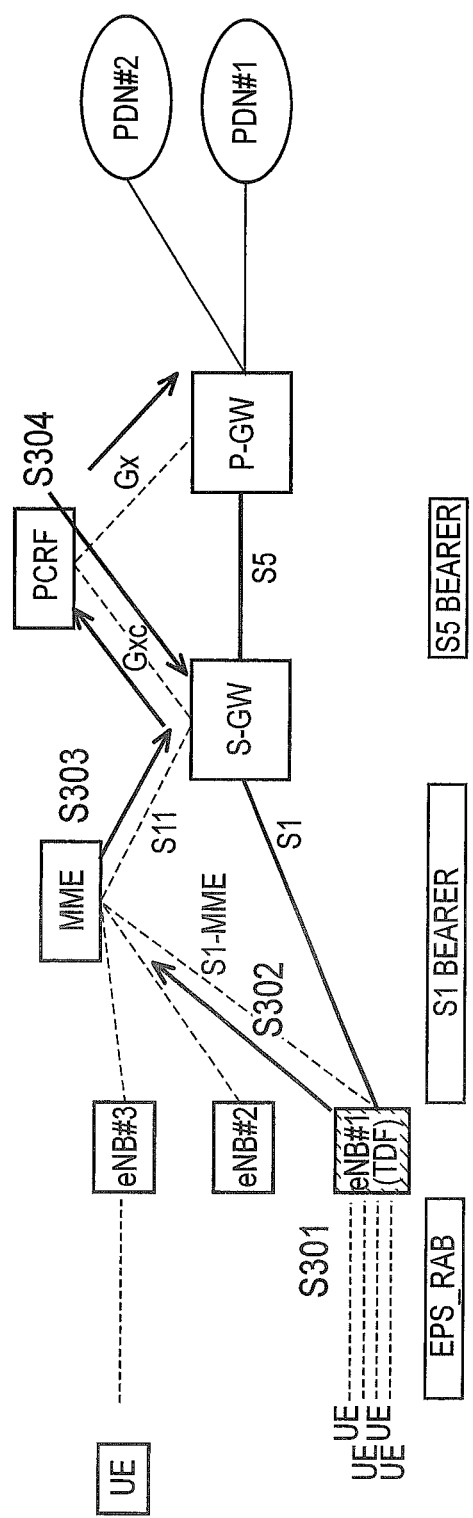
FIG. 6 is a diagram for explaining an operation of a mobile communication system according to Modified Example 1 of the present invention.

As illustrated in FIG. 6, when the eNB#1 detects congestion in the eNB by detecting a buffer overflow in step S301, the eNB#1 performs the DPI and determines a flow to be adjusted in the data flow rate in the EPS-RAB involved in the congestion.

In step S302, the eNB#1 notifies the MME of the cause of the congestion and the identifier information of the flow in the EPS-RAB to be adjusted in the data flow rate via the S1-MME interface.

In step S303, the MME sends the S-GW "Bearer Modification" indicating an instruction to modify the settings of flows in the core network bearers corresponding with the EPS-RAB involved in the congestion on the basis of the notification, and the S-GW sends the PCRF "Bearer Modification" indicating an instruction to modify the settings of flows in the core network bearers corresponding with the EPS-RAB involved in the congestion.

In step S304, the PCRF sends the S-GW and the P-GW "Bearer Modification" indicating an instruction to modify the settings of flows in the core network bearers corresponding with the EPS-RAB involved in the congestion.

Here, in response to the "Bearer Modification," the S-GW and the P-GW modify the settings of flows in the S1 bearer and flows in the S5 bearer corresponding with the EPS-RAB involved in the congestion.

To be specific, the S-GW and the P-GW reduce the bands of the flows in the S1 bearer and the bands of the flows in the S5 bearer corresponding with the EPS-RAB involved in the congestion, in response to the "Bearer Modification."

For example, in this case, the S-GW and the P-GW can perform control on the flow-by-flow basis in the S1 bearer and the S5 bearer having the same QCI set therein, by reducing the band of a flow for non-GBR (Guaranteed Bit Rate) data communication (for example, communication on game) without reducing the band of a flow for emergency communication (for example, communication on disaster).

In the second place, the operation in a case where the GTP is applied to the S5 interface is described with reference to FIG. 7.

Figure 7:
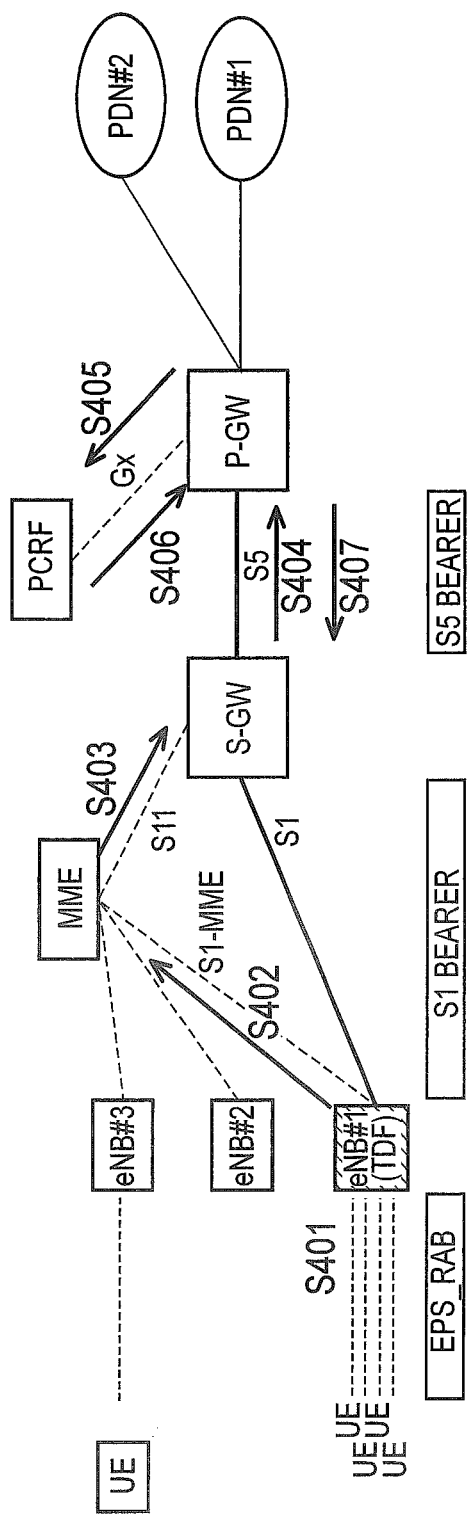
FIG. 7 is a diagram for explaining an operation of the mobile communication system according to Modified Example 1 of the present invention.

As illustrated in FIG. 7, in step S401, when the eNB#1 detects congestion in the eNB by detecting a buffer overflow, the eNB#1 performs the DPI and determines a flow to be adjusted in the data flow rate in the EPS-RAB involved in the congestion.

In step S402, the eNB#1 notifies the MME of the cause of the congestion and the identifier information of the flow in the EPS-RAB via the S1-MME interface.

In step S403, the MME sends the S-GW "Bearer Modification" indicating an instruction to modify the settings of flows in the core network bearers corresponding with the EPS-RAB involved in the congestion on the basis of the notification. In step S404, the S-GW sends the P-GW "Bearer Modification" indicating an instruction to modify the settings of the flows in the core network bearers corresponding with the EPS-RAB involved in the congestion. In step S405, the P-GW sends the PCRF "Bearer Modification" indicating an instruction to modify the settings of the flows in the core network bearers corresponding with the EPS-RAB involved in the congestion.

In step S406, the PCRF sends the P-GW "Bearer Modification" indicating an instruction to modify the settings of the flows in the core network bearers corresponding with the EPS-RAB involved in the congestion. In step S407, the P-GW sends the S-GW "Bearer Modification" indicating an instruction to modify the settings of the flows in the core network bearers corresponding with the EPS-RAB involved in the congestion.

Here, in response to the "Bearer Modification," the S-GW and the P-GW modify the settings of the flows in the S1 bearer and the flows in the S5 bearer corresponding with the EPS-RAB involved in the congestion.

To be specific, the S-GW and the P-GW reduce the bands of the flows in the S1 bearer and the bands of the flows in the S5 bearer corresponding with the EPS-RAB involved in the congestion, in response to the "Bearer Modification."

For example, in this case, the S-GW and the P-GW can perform control on the flow-by-flow basis in the S1 bearer and the S5 bearer having the same QCI set therein, by reducing the band of a flow for non-GBR data communication without reducing the band of a flow for emergency communication.

In the mobile communication system according to present Modification Example 1, when the eNB detects congestion, the eNB can notify the MME of the cause of the congestion and the identify information of flows in the EPS-RAB involved in the congestion. Thus, the mobile communication system adjusts not only the data flow rate in the EPS-RAB but also the bands of the flows in the core network bearers corresponding with the EPS-RAB, thereby achieving effective utilization of resources.

MODIFIED EXAMPLE 2

Hereinafter, with reference to FIGS. 8 and 9, a mobile communication system according to Modified Example 2 of the present invention is described with attention paid to different points from the foregoing mobile communication system according to the first embodiment.

Figure 8:
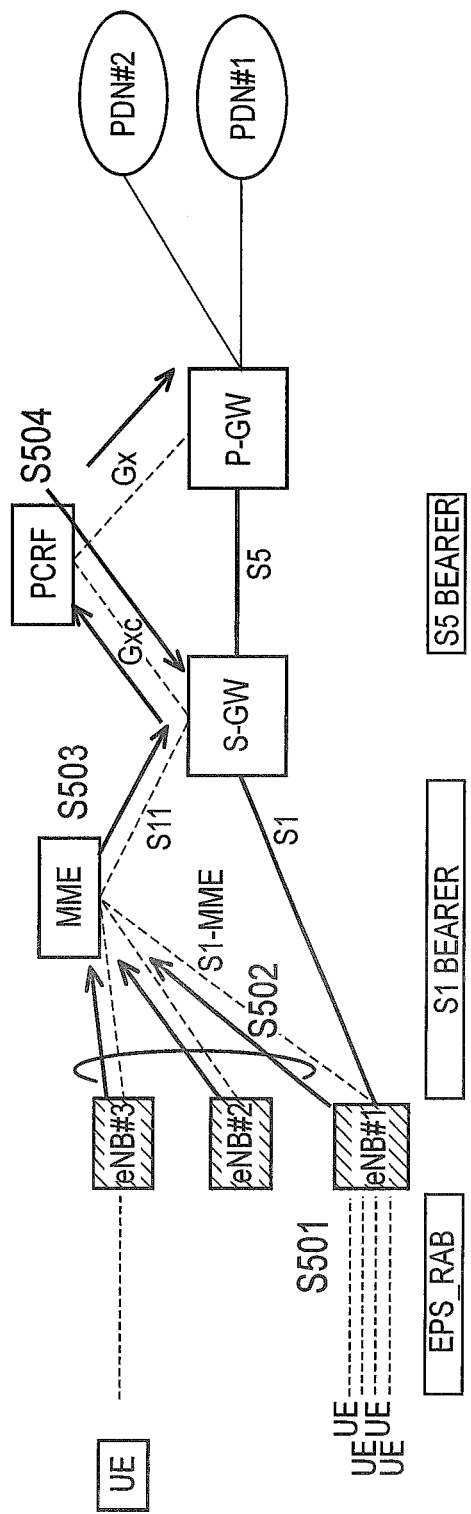
FIG. 8 is a diagram for explaining an operation of the mobile communication system according to Modified Example 2 of the present invention.

In the first place, with reference to FIG. 8, description is provided for an operation in a special case, such as the occurrence of a disaster (which is set in advance by a network operation carrier), where the PMIP is applied to the S5 interface.

As illustrated in FIG. 8, multiple eNB#1 to eNB#3 detect congestion by detecting buffer overflows in step S501, and notify the MME of the causes of the congestion and the identifier information of the EPS-RABs involved in the congestion (the identifier information on all the EPS-RABs in Modified Example 2) via the S1-MME interface in S502.

In step S503, based on the notification, the MME sends the S-GW "Bearer Modification" indicating an instruction to modify the settings of the core network bearers corresponding with the EPS-RABs involved in the congestion, and the S-GW sends the PCRF "Bearer Modification" indicating an instruction to modify the settings of the core network bearers corresponding with the EPS-RABs involved in the congestion.

Here, since the multiple eNB#1 to eNB#3 notify the MME of the identifier information of all the EPS-RABs as the identifier information of the EPS-RABs involved in the congestion, the MME recognizes that it is a special case such as the occurrence of a disaster, evenly reduces the bands (resources) of all the EPS-RABs, and sends the S-GW "Bearer Modification" indicating an instruction to evenly reduce the bands (resources) of the core network bearers corresponding with all the EPS-RABs.

Similarly, the S-GW sends the PCRF "Bearer Modification" indicating an instruction to evenly reduce the bands (resources)) of the core network bearers corresponding with all the EPS-RABs.

In step S504, the PCRF sends the S-GW and the P-GW "Bearer Modification" indicating an instruction to evenly reduce the bands of the core network bearers corresponding with all the EPS-RABs.

Here, the S-GW and the P-GW reduce the bands of the S1 bearer and the S5 bearer corresponding with all the EPS-RABs in response to the "Bearer Modification."

Figure 9:
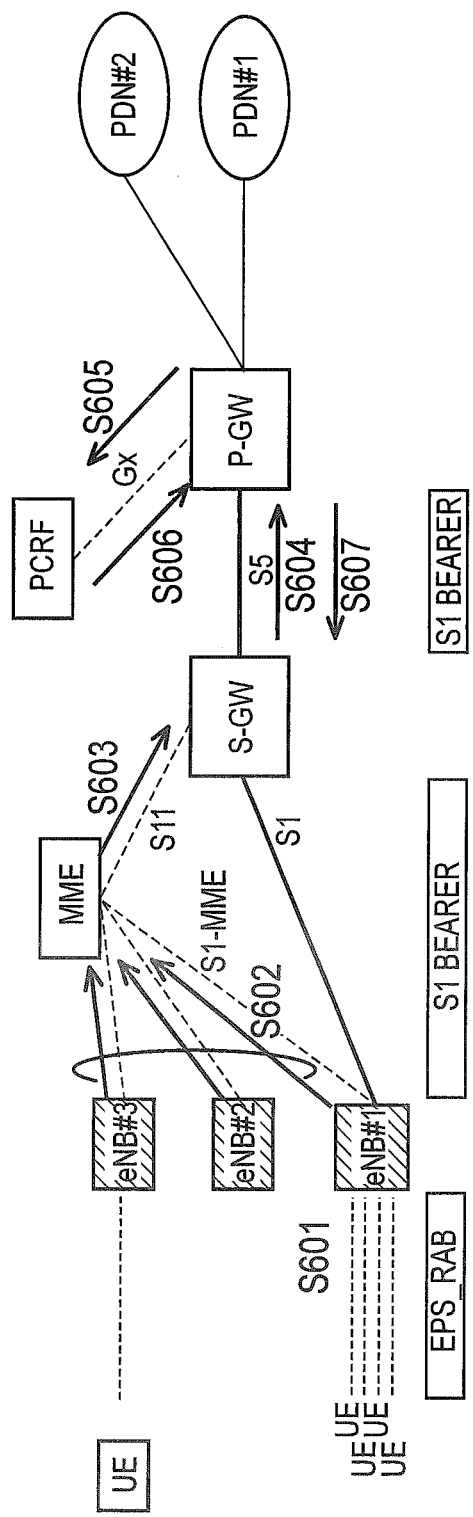
FIG. 9 is a diagram for explaining an operation of the mobile communication system according to Modified Example 2 of the present invention.

In the second place, with reference to FIG. 9, description is provided for an operation in a special case, such as the occurrence of a disaster (which is set in advance by a network operation carrier), where the GTB is applied to the S5 interface.

As illustrated in FIG. 9, multiple eNB#1 to eNB#3 detect congestion by detecting buffer overflows in step S601, and notify the MME of the causes of the congestion and the identifier information of the EPS-RABs involved in the congestion (the identifier information on all the EPS-RABs in Modified Example 2) via the S1-MME interface in step S602.

In step S603, based on the notification, the MME sends the S-GW "Bearer Modification" indicating an instruction to modify the settings of the core network bearers corresponding with the EPS-RABs involved in the congestion. In step S604, the S-GW sends the P-GW "Bearer Modification" indicating an instruction to modify the settings of flows in the core network bearers corresponding with the EPS-RABs involved in the congestion. In step S605, the P-GW sends the PCRF "Bearer Modification" indicating an instruction to modify the settings of the flows in the core network bearers corresponding with the EPS-RABs involved in the congestion.

Here, since the multiple eNB#1 to eNB#3 notify the MME of the identifier information of all the EPS-RABs as the identifier information of the EPS-RABs involved in the congestion, the MME recognizes that it is a special case such as the occurrence of a disaster, evenly reduces the bands (resources) of all the EPS-RABs, and sends the S-GW "Bearer Modification" indicating an instruction to evenly reduce the bands (resources) of the core network bearers corresponding with all the EPS-RABs.

Similarly, the S-GW sends the P-GW "Bearer Modification" indicating an instruction to evenly reduce the bands (resources) of the core network bearers corresponding with all the EPS-RABs.

Moreover, the P-GW sends the PCRF "Bearer Modification" indicating an instruction to evenly reduce the bands (resources) of the core network bearers corresponding with all the EPS-RABs.

In step S606, the PCRF sends the P-GW "Bearer Modification" indicating an instruction to evenly reduce the bands of the core network bearers corresponding with all the EPS-RABs. In step S607, the P-GW sends the S-GW "Bearer Modification" indicating an instruction to evenly reduce the wide bands of the core network bearers corresponding with all the EPS-RABs.

Here, the S-GW and the P-GW evenly reduce the bands of the S1 bearer and the S5 bearer corresponding with all the EPS-RABs in response to the "Bearer Modification."

It should be noted that when the P-GW receives a threshold number or more of incoming calls, the PCRF regards it as a special case such as the occurrence of a disaster, and likewise evenly reduces the resources of all the communications, i.e., the bands of the S1 bearer and the S5 bearer corresponding with all the EPS-RABs (and the bands of all the EPS-RABs).

In a special case such as the occurrence of a disaster, the mobile communication system according to Modified Example evenly reduces the resource allocation to all the communications in accordance with a guideline set in advance by a network operation carrier, and thereby allocates the limited resources evenly to enable as many communications as possible.

The aforementioned features of the present embodiment can be expressed in the following way.

A first feature of the present embodiment is summarized as a mobile communication method in which a UE (mobile station) transmits and receives data signals via an EPS-RAB (radio access bearer) established between the UE and an eNB (radio base station) and an S1 bearer (core network bearer) established between the eNB and an S-GW (gateway apparatus), the method including a step A of causing the eNB to notify a MME (mobility management node) of a cause of congestion and identifier information of the EPS-RAB involved in the congestion, when the eNB detects the congestion.

In the first feature of the present invention, the method may further include a step B of causing the MME to send an instruction to modify a setting of the core network bearer corresponding with the EPS-RAB involved in the congestion when the MME receives the aforementioned cause of the congestion and the aforementioned identifier information of the EPS-RAB involved in the congestion; and a step C of causing the S-GW to modify the setting of the core network bearer (S1 bearer) corresponding with the EPS-RAB involved in the congestion when the S-GW receives the instruction.

In the first feature of the present invention, in the step C, when the S-GW receives the foregoing instruction, the S-GW may modify the setting on the flow-by-flow basis in the S1 bearer corresponding with the EPS-RAB involved in the congestion.

In the first feature of the present invention, the method may further include a step of causing the MME to evenly reduce bands of core network bearers corresponding with all EPS-RABs, when multiple eNB#1 to eNB#3 notify the MME of identifier information of all the EPS-RABs as the foregoing identifier information of the EPS-RABs involved in the congestion.

A second feature of the present embodiment is summarized as a mobile communication system configured such that a UE transmits and receives data signals via an EPS-RAB established between the UE and an eNB and an S1 bearer established between the eNB and an S-GW, and that the eNB is configured to notify an MME of a cause of congestion and identifier information of an EPS-RAB involved in the congestion when the eNB detects the congestion.

In the second feature of the present invention, the MME may be configured to issue an instruction to modify a setting of the core network bearer corresponding with the EPS-RAB involved in the congestion, when the MME receives the foregoing cause of the congestion and the foregoing identifier information of the EPS-RAB involved in the congestion, and the S-GW may be configured to modify the setting of the core network bearer (S1 bearer) corresponding with the EPS-RAB involved in the congestion when the S-GW receives the above instruction.

In the second feature of the present invention, the S-GW may be configured to modify the setting on the flow-by-flow basis in the S1 bearer corresponding with the EPS-RAB involved in the congestion, when the S-GW receives the above instruction.

In the second feature of the present invention, the MME may be configured to reduce bands of core network bearers corresponding with all EPS-RABs when multiple eNB#1 to eNB#3 notify the MME of identifier information of all the EPS-RABs as the foregoing identifier information of the EPS-RABs involved in the congestion.

A third feature of the present embodiment is summarized as an eNB in a mobile communication system configured such that a UE transmits and receives data signals via an EPS-RAB established between the UE and the eNB and an S1 bearer established between the eNB and an S-GW, and that the eNB includes a transmission unit 13 configured to notify an MME of a cause of congestion and identifier information of an EPS-RAB involved in the congestion when the eNB detects the congestion.

In the third feature of the present invention, the transmission unit 13 may be configured to notify of identifier information of a flow in the above EPS-RAB involved in the congestion.

In the third feature of the present invention, the transmission unit 13 may be configured to notify of the cause of the congestion indicating that a buffer for a particular mobile station is congested.

In the third feature of the present invention, the transmission unit 13 may be configured to notify of the cause of the congestion indicating that a general buffer is congested.

It should be noted that the foregoing operations of the UE, the eNB, the MME, the S-GW, the P-GW, the PCRF and the like may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the UE, the eNB, the MME, the S-GW, the P-GW, the PCRF or the like. Otherwise, the storage medium and the processor may be provided as discrete components inside the UE, the eNB, the MME, the S-GW, the P-GW, the PCRF or the like.

The present invention has been described in detail by use of the foregoing embodiments. However, it is apparent that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

The entire contents of Japanese Patent Application No. 2011-152256 (filed on Jul. 8, 2011) and Japanese Patent Application No. 2011-245588 (filed on Nov. 9, 2011) are incorporated by reference in the present specification.

INDUSTRIAL APPLICABILITY

As has been described above, according to the present invention, it is possible to provide a mobile communication method, a mobile communication system and a radio base station, each of which enables effective utilization of resources, when an eNB detects congestion therein, by adjusting a data flow rate in an EPS-RAB and a band of a core network bearer corresponding with the EPS-RAB.

EXPLANATION OF THE REFERENCE NUMERALS

UE mobile station
eNB radio base station
MME mobility management node
S-GW serving gateway apparatus
P-GW packet data network gateway apparatus
PCRF policy and charging rules server apparatus
11 detection unit
12 adjustment unit
13 transmission unit

The invention claimed is:

1. A mobile communication method in which a mobile station transmits and receives a data signal via a radio access bearer established between the mobile station and a radio base station and via a core network bearer established between the radio base station and a gateway apparatus, the method comprising:
 a step A of causing the radio base station to notify a mobility management node of a cause of congestion and identifier information of the radio access bearer involved in the congestion, when the radio base station detects the congestion;
 a step B of causing the mobility management node to issue an instruction to modify a setting of the core network bearer corresponding with the radio access bearer involved in the congestion, when the mobility management node receives the cause of the congestion and the identifier information of the radio access bearer involved in the congestion; and
 a step C of causing the gateway apparatus to modify the setting of the core network bearer corresponding with the radio access bearer involved in the congestion when the gateway apparatus receives the instruction.

2. The mobile communication method according to claim 1, wherein, in the step C, the gateway apparatus modifies the setting on a flow-by-flow basis in the core network bearer corresponding with the radio access bearer involved in the congestion, when the gateway apparatus receives the instruction.

3. The mobile communication method according to claim 1, further comprising a step of:
 when a plurality of radio base stations notify the mobility management node of identify information of all radio access bearers as the identifier information of radio access bearers involved in the congestion, causing the mobility management node to issue an instruction to evenly reduce bands of the core network bearers corresponding with all the radio access bearers.

4. A mobile communication system in which a mobile station transmits and receives a data signal via a radio access bearer established between the mobile station and a radio base station and via a core network bearer established between the radio base station and a gateway apparatus,
 wherein the radio base station is configured to notify a mobility management node of a cause of congestion and identifier information of the radio access bearer involved in the congestion, when the radio base station detects the congestion,
 wherein the mobility management node is configured to issue an instruction to modify a setting of the core network bearer corresponding with the radio access bearer involved in the congestion, when the mobility management node receives the cause of the congestion and the identifier information of the radio access bearer involved in the congestion, and
 wherein the gateway apparatus modifies the setting of the core network bearer corresponding with the radio access bearer involved in the congestion when the gateway apparatus receives the instruction.

5. The mobile communication system according to claim 4, wherein the gateway apparatus modifies the setting on a flow-by-flow basis in the core network bearer corresponding with the radio access bearer involved in the congestion, when the gateway apparatus receives the instruction.

6. The mobile communication system according to claim 4, wherein the mobility management node is configured to, when a plurality of radio base stations notify the mobility management node of identify information of all radio access bearers as the identifier information of radio access bearers involved in the congestion, issue an instruction to evenly reduce bands of the core network bearers corresponding with all the radio access bearers.

7. A radio base station in a mobile communication system comprises a mobile station that transmits and receives a data signal via a radio access bearer established between the mobile station and the radio base station and via a core network bearer established between the radio base station and a gateway apparatus, the radio base station comprising: a transmission unit configured to notify a mobility management node of a cause of congestion and identifier information of the radio access bearer involved in the congestion, when the radio base station detects the congestion, involved in the congestion, when the mobility management node receives the cause of the congestion and the identifier information of the radio access bearer involved in the congestion, and the gateway apparatus modifies the setting of the core network bearer corresponding with the radio access bearer involved in the congestion when the gateway apparatus receives the instruction.

8. The radio base station according to claim 7, wherein the transmission unit is configured to notify of identifier information of a flow in the radio access bearer involved in the congestion.

9. The radio base station according to claim 7, wherein the transmission unit is configured to notify of the cause of the congestion indicating that a buffer for a particular mobile station is congested.

10. The radio base station according to claim 7, wherein the transmission unit is configured to notify of the cause of the congestion indicating that a general buffer is congested.

* * * * *